June 15, 1926.
R. B. FISHER ET AL
PORTABLE POWER UNIT
Filed Oct. 30, 1920
1,588,537
3 Sheets-Sheet 3
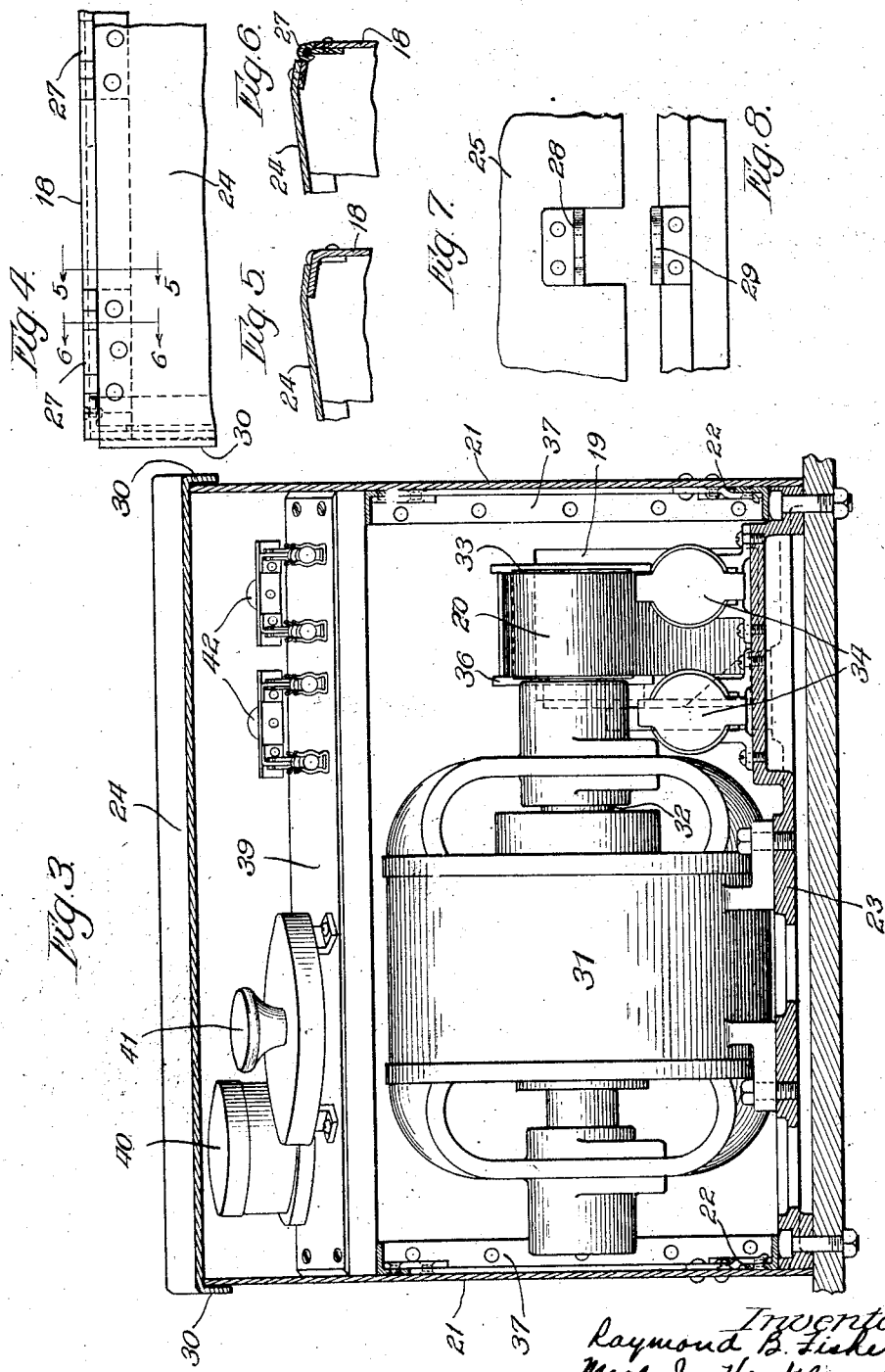

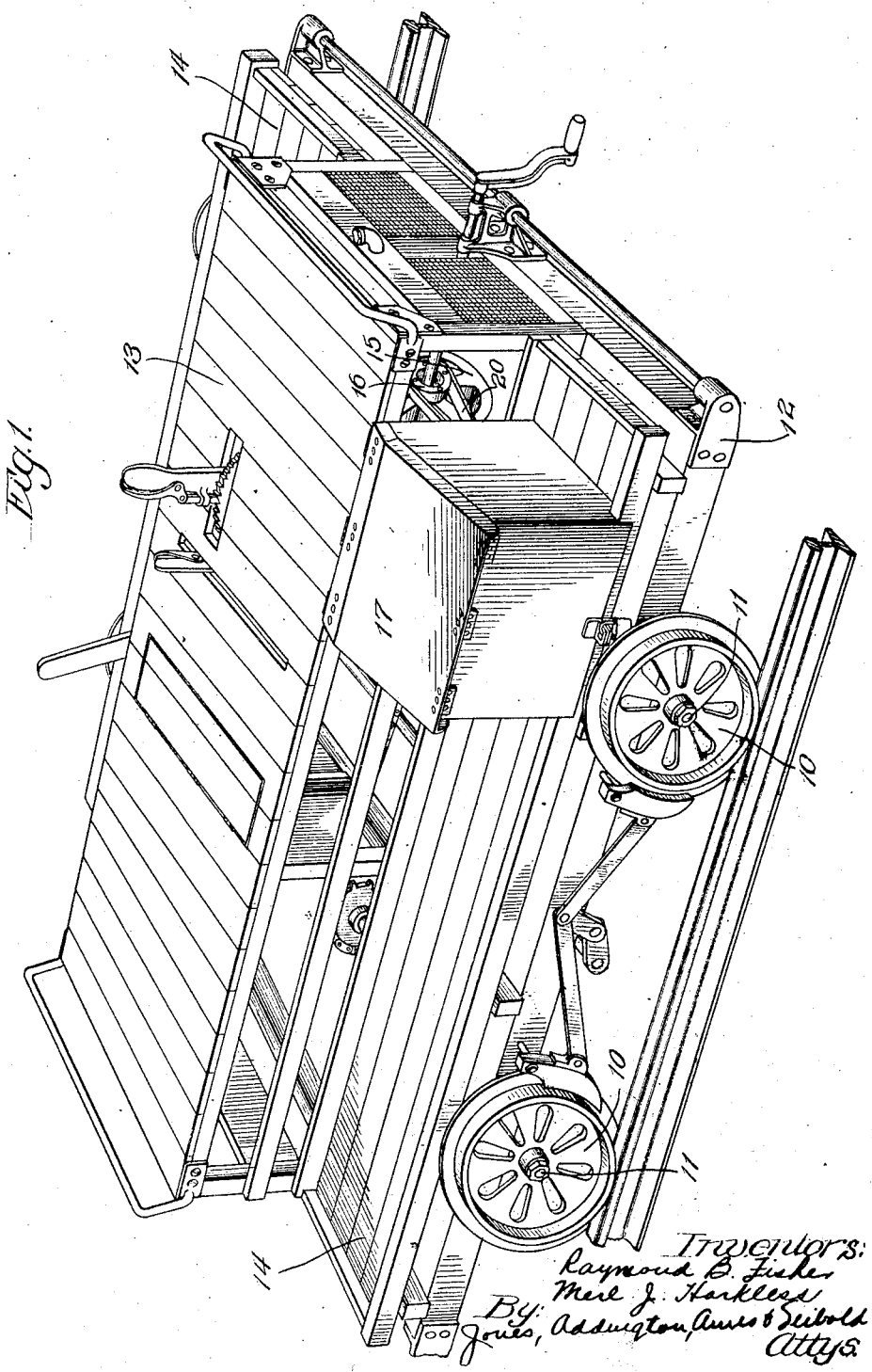

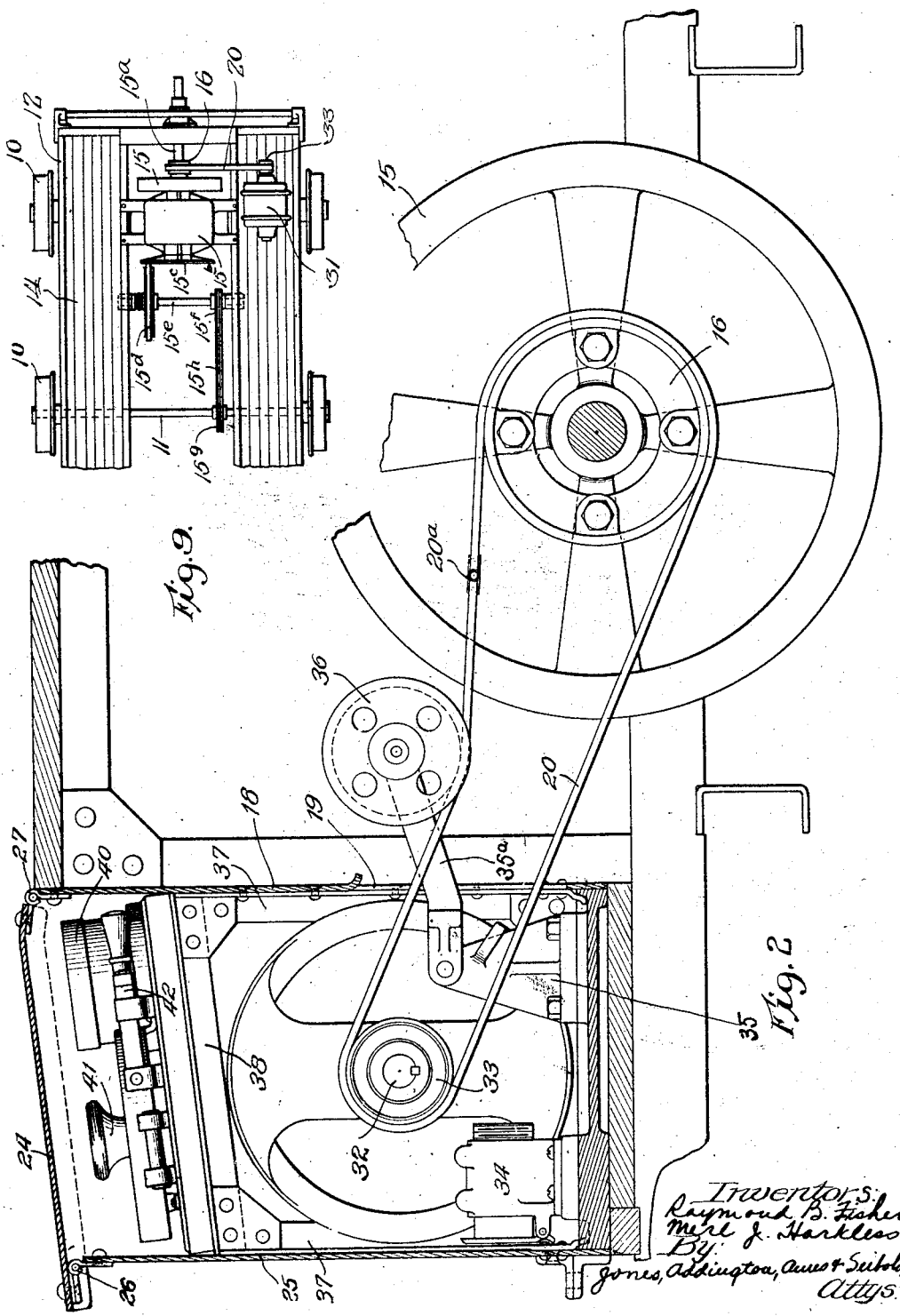

Patented June 15, 1926.

1,588,537

UNITED STATES PATENT OFFICE.

RAYMOND BENSON FISHER AND MERL J. HARKLESS, OF HARVEY, ILLINOIS, ASSIGNORS TO THE BUDA COMPANY, OF CHICAGO, ILLINOIS, A CORPORATION OF ILLINOIS.

PORTABLE POWER UNIT.

Application filed October 30, 1920. Serial No. 420,661.

Our invention relates to portable power units and it has particular relation to devices of the character designated wherein means are provided in combination with a railroad section car whereby a supply of electric current may be available at isolated points along the railroad for use in connection with various track tools, etc.

The primary object of our invention is to associate with a hereinafter described type of section bar, a generator which may be driven from the shaft of the prime mover of the section car, such prime mover usually being of the internal combustion type. It is, moreover, our intention to so connect the generator and the prime mover that the former may be operated while the car itself is standing still and to this end we belt the generator to the prime mover at a point ahead of the clutch mechanism.

Again, we propose to place the generator, as well as an instrument board through which the circuits from said generator are led, in a substantially water-tight enclosure which is simple in construction, and which admits of the top and front portions thereof being lifted or swung away from the generator and panel-board themselves whereby the latter are disclosed to view. The ends of this housing are also detachable to make the interior thereof even more accessible, if desired.

The generator is mounted in the bottom of the housing and the instrument board overlies the same and is secured within the housing so that it is readily accessible to the operator upon the raising of the cover. Suitable plugs whereby any desired track tools or lights may be energized are provided within the enclosure.

The enclosure also contains a support for an idler pulley which admits of the generator being belted to the prime mover, the entire generator unit being thereby self contained and easily applicable to a section car of the type hereinafter described. It should be noted, however, that while we have illustrated the housing and its enclosed elements as mounted on a section car wherein a central portion has two ledge portions coextensive therewith, our invention should not be limited to cars of this character since it is of considerable benefit when used with any section car wherewith it is desirable to associate a reliable source of electric energy.

Referring now to the drawings:

Fig. 1 is a perspective view of a section car having a housing enclosing a dynamo electric machine and associated with said car in accordance with our invention;

Fig. 2 is a fragmentary, elevational, sectional view taken transversely through the housing and a portion of the car, and illustrates the manner in which the dynamo electric machine is associated with the prime mover of the section car;

Fig. 3 is an elevational, sectional view taken longitudinally through the housing;

Figs. 4, 5, 6, 7 and 8 are detail views of various portions of the housing; and

Fig. 9 is a plan view of the motor car.

Referring more particularly to the drawing, a section car comprises wheels 10 having axles 11 extending therebetween and upon which is supported framing 12. A central portion 13 of the car body itself is raised and has ledge portions 14 co-extensive therewith and positioned somewhat below the level thereof, whereby a structure is formed whereupon workmen may sit while the car is propelled along the tracks.

A fly-wheel 15 is mounted on a shaft $15^a$, the latter being driven by an engine $15^b$. This engine is disposed within the central portion 13 of the car and the shaft $15^a$ is adapted to be operably associated with the rear wheels of the car through a friction clutch mechanism comprising a disc $15^c$ carried on the shaft $15^a$, and a disc $15^d$ bearing thereagainst and movable along a shaft $15^e$, said latter disc $15^d$ being splined to the shaft $15^e$ in such manner that the latter is driven at a plurality of desired speeds depending upon the position of the disc $15^d$. Sprocket wheels $15^f$ and $15^g$ are mounted upon the shaft $15^e$ and the rear axle 11 respectively, a driving chain $15^h$ connecting the two. By means of the mechanism just described the rear wheel of the car is driven at any desired speed or not at all as the case may be. Likewise mounted on the shaft $15^a$ is a pulley 16.

A housing 17 is mounted on one of the ledge portions in such manner that the bottom thereof is supported by the latter and the back is adjacent the pulley upon the prime mover. The back wall 18 of the housing is apertured at 19 to admit of the passage of a belt 20 therethrough. Side walls 21—21 are adapted to fit down over brackets 22—22 attached to a base 23 of the housing and thereby be simply secured in place without the use of bolts or otherwise. A top portion 24 is hinged to a front wall 25 as at 26 and the entire structure so formed may be rotatably moved about a hinge 27 whereby the entire interior of the housing is disclosed. On the front wall of the housing is mounted an eye 28 which cooperates with another eye 29 whereby the movable walls of the closure can be locked against unwarranted opening. It will be observed that the top portion 24 is provided with lips 30—30 which hold the side walls 21 in place when the front wall 25 is locked in its down position.

Mounted on the base 23 is a dynamo electric machine 31 having a shaft 32 and a driving pulley 33 around which latter passes the belt 20, whereby the machine 31 may be operated from the prime mover 15. Sockets 34 for the reception of plugs to which are attached any desired electrical tools, are also mounted on the base member 23. A bracket 35 is mounted within the enclosure and has an arm 35ª which extends outwardly therefrom and carries an idler pulley 36 which tends to satisfactorily tighten the belt 20.

Within the enclosure or housing 17 is positioned a framing consisting of uprights 37 and cross pieces 38 extending therebetween, this frame serving as a support for an instrument board 39. On the latter are mounted any desired instruments, here shown as a meter 40, a field control rheostat 41, and a pair of switches 42 through which are led the circuits which terminate in the sockets 34.

The belt 20 is shown as having its ends secured together by a fastening device or lacing 20ª, by means of which the belt may be removed from the pulleys 16 and 33 and the entire housing and its contents thereby rendered independent and removable as a unit from the section car.

It will be seen from the foregoing description that we have placed upon a railroad section car a very desirable adjunct and have associated the same with the car in such a way that the space it occupies is substantially negligible. Moreover, we have provided a particular waterproof housing and have so formed the latter that one locking device is sufficient to prevent tampering with the interior elements therein although the structure is, at the same time, by reason of the particular features heretofore described, of the knock-down type. It will be seen that, after the cover is raised and the side walls thereby freed from the lip portions 30, the latter may be removed, whereupon the entire interior of the housing is available for inspection or otherwise.

While we have described but one embodiment of our invention it is obvious that many modifications therein may occur to those skilled in the art and that the above disclosure may furnish information whereby many modifications may be made which are within the scope of this invention and we desire, therefore, that the same be limited only by the showing of the prior art or by the appended claims.

Having thus described our invention, what we claim as new and desire to secure by Letters Patent is:

1. In a railroad section car comprising a body having a central portion and ledges substantially coextensive therewith, a prime mover mounted in said central portion, a dynamo-electric machine positioned on one of said ledge portions, and means for driving said dynamo-electric machine from said prime mover.

2. In combination with a railroad section car and a prime mover for propelling the same, a generating unit mounted on said car, a waterproof housing adapted to be removably disposed about said unit, and means for driving said unit from said prime mover irrespective of the speed of said car.

3. In combination with a railroad section car and a prime mover for propelling the same, a housing mounted adjacent said prime mover, a dynamo-electric machine within said housing, an instrument board also within said housing and overlying said machine and driving means extending into said housing and connecting said dynamo-electric machine and said prime mover.

4. In combination with a railroad section car and a prime mover for propelling the same, a housing mounted adjacent said prime mover and comprising hingedly-joined top and front members adapted to be raised to disclose the interior of said housing, a dynamo-electric machine mounted on the bottom of said housing, an instrument board overlying said machine and secured within said housing, and means for driving said machine from said prime mover.

5. In combination with a railroad section car comprising a prime mover for propelling the same, a dynamo-electric unit adapted to be bodily applied to said car comprising a housing, a dynamo-electric machine and instrument board mounted therein, and an idler pulley secured within said housing and extending outside thereof whereby said machine may be satisfactorily driven from said propelling means.

6. In combination with a railroad section car comprising a raised central portion and ledge portions substantially co-extensive therewith, a housing having its bottom on one of said ledge portions and its back substantially against the side of said raised portion, a propelling prime mover situated within said central portion, a dynamo-electric machine positioned within said housing, and driving means extending between said machine and said propelling means.

7. In combination with a railroad section car comprising a raised central portion and ledge portions substantially co-extensive therewith, a housing having its bottom on one of said ledge portions and its back substantially against the side of said raised portion, said housing and its contents being removable as a unit from said car, a propelling prime mover situated within said central portion, a dynamo-electric machine positioned within said housing, and driving means extending between said machine and said propelling means.

8. The combination with a railroad section car having a raised central portion and ledge portions substantially co-extensive therewith, of a prime mover situated within said central portion, and having its drive shaft extending longitudinally of the car, transmission means from said prime mover for propelling said car, a dynamo-electric machine mounted at one side of said raised central portion, said dynamo-electric machine having its shaft extending parallel to said first shaft, and transmission means between said shafts.

In witness whereof, we have hereunto subscribed our names.

RAYMOND BENSON FISHER.
MERL J. HARKLESS.